C. H. HOWARD & H. M. PFLAGER.
ARTICULATED CAR TRUCK.
APPLICATION FILED JULY 25, 1914.
1,144,328. Patented June 22, 1915.
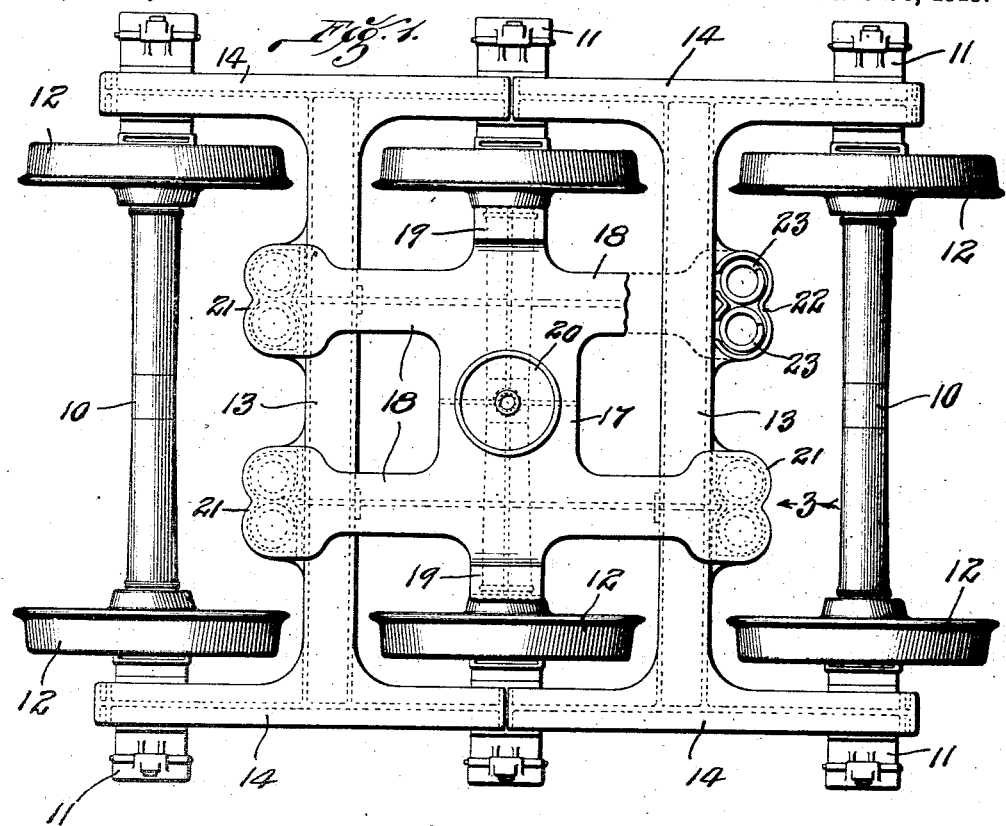
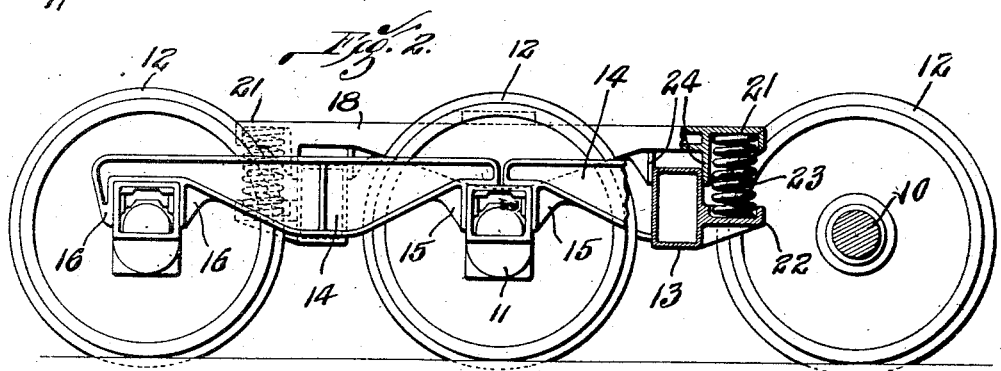
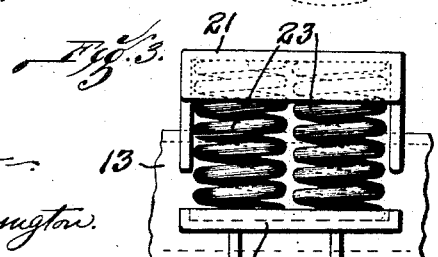
Inventors—
Clarence H. Howard,
Harry M. Pflager,

UNITED STATES PATENT OFFICE.

CLARENCE H. HOWARD AND HARRY M. PFLAGER, OF ST. LOUIS, MISSOURI, ASSIGNORS, BY MESNE ASSIGNMENTS, TO COMMONWEALTH STEEL COMPANY, A CORPORATION OF NEW JERSEY.

ARTICULATED CAR-TRUCK.

1,144,328.  Specification of Letters Patent.  Patented June 22, 1915.

Application filed July 25, 1914. Serial No. 852,977.

*To all whom it may concern:*

Be it known that we, CLARENCE H. HOWARD and HARRY M. PFLAGER, citizens of the United States, residing at St. Louis, Missouri, have invented a certain new and useful Improvement in Articulated Car-Trucks, of which the following is a full, clear, and exact description, such as will enable others skilled in the art to which it appertains to make and use the same, reference being had to the accompanying drawings, forming part of this specification, in which—

Figure 1 is a plan view of a truck frame of our improved construction. Fig. 2 is a side elevational view of the truck with parts broken away and in vertical section. Fig. 3 is an enlarged detailed view taken looking in the direction indicated by the arrow 3 in Fig. 1.

Our invention relates generally to railway car trucks and more particularly to a six wheel truck of the articulated type, the principal object of our invention being to provide a truck wherein the truck frame is formed in two parts and the center bolster in one part, said parts being combined with each other and with the journal boxes on the axles of the truck so that loads impressed on the truck will be equally divided between the three axles thereof.

Further objects of our invention are to generally improve upon and simplify the present forms of trucks of the type to which our invention relates, and further to provide a comparatively simple, strong and durable articulated truck which can be easily and cheaply manufactured and readily assembled or taken apart, which latter provision greatly facilitates repairs when the same are necessary.

With the foregoing and other objects in view, our invention consists in certain novel features of construction and arrangement of parts, hereinafter more fully described and claimed.

Referring by numerals to the accompanying drawings, 10 designates the axles having their ends mounted in the usual journal boxes 11, and positioned upon said axles are the usual wheels 12.

The frame of our improved truck is made in two parts which are duplicates and of substantially H-shape when viewed in plan. Each part comprises a transom 13 with the ends of which are formed integral side or wheel pieces 14.

As shown in the drawings, the transoms 13 are substantially tubular or hollow and the wheel pieces substantially of I-beam shape in cross section, although these parts may vary in cross sectional shape as desired.

When properly assembled, the transoms 13 occupy positions between the truck wheels with the inner ends of the wheel pieces 14 resting upon the journal boxes on the center axle and with the outer ends of said wheel pieces resting upon the journal boxes on the outer axles. Thus, each part of the frame has four points of support, namely, two on the outer axle and two upon the inner or center axle.

Formed integral with or fixed to the inner portions of the wheel pieces are depending brackets 15 which normally bear against the sides of the journal boxes on the center axle, and formed integral with the outer portions of said wheel pieces are depending brackets 16 which engage the side faces of the journal boxes on the outer axle.

The center bolster of our improved truck is preferably cast in one piece, is substantially of H-shape when viewed in plan and comprises a transversely disposed center member 17 and a pair of longitudinally disposed side members 18.

Formed integral with the ends of the center member 17 are outwardly and upwardly projecting brackets which serve as side bearings 19 and formed integral with or fixed to the top of said center member and at the center thereof is a center bearing 20.

The ends of the side members 18 overlie and extend slightly beyond the transoms 13 and formed in the undersides of the ends of said side members are spring seats 21.

Formed integral with or fixed to the transoms 13 and projecting outwardly therefrom are spring seats 22, and arranged therein are springs 23, the upper ends of which are positioned in the spring seats 21.

Formed integral with the ends of the side members 18 and just inside the spring seats 21 are depending brackets or bearing plates 24, the same engaging the side faces of the transoms and serving as guides for any vertical movement of the center bolster with respect to the parts of the truck frame or vice versa.

By our improved construction each part of the truck frame has four points of support upon the axles forming a part of the truck and the center bolster is yieldingly supported at four points upon the parts of the truck frame. Such construction provides the requisite flexibility and at the same time insures an even distribution of the load upon all three axles.

The distance from a transverse line drawn through the centers of the spring seats at one end of the truck to the center of the adjacent outer axle is just half the distance from the center line of the spring seats to the center of the center axle, and thus two-thirds of the load carried by each half of the truck frame will be transmitted to the outer axle and one-third of the load to the inner axle, thus equally dividing the load between all three axles.

A truck of our improved construction is comparatively simple, can be easily and cheaply manufactured, has the necessary flexibility, and is constructed so that the carried load is equally divided between the axles forming a part of the truck.

It will be readily understood that minor changes in the size, form and construction of the various parts of our improved truck may be made and substituted for those herein shown and described, without departing from the spirit of our invention, the scope of which is set forth in the appended claims.

We claim:

1. In a car truck, a series of wheel carrying axles, a truck frame composed of two separately formed and independently movable parts, each part comprising a transom and a pair of wheel pieces rigidly fixed thereto, each part having four points of support upon the axles, and a center bolster supported by the truck frame, the points of support for said center bolster being located so that the supported load is transmitted to and divided equally between the axles.

2. In a car truck, a series of wheel carrying axles, a truck frame composed of two separately formed and independently movable parts, each part comprising a transom and a pair of wheel pieces rigidly fixed thereto, which parts are supported by said axles, and a center bolster supported by said truck frame, the points of support for said center bolster being located so that the loads impressed on the bolster are transmitted to and divided equally between the axles.

3. In a car truck, a series of wheel carrying axles, a truck frame composed of two separately formed and independently movable parts, each part comprising a transom and a pair of wheel pieces rigidly fixed thereto, each part having four points of support upon the axles, and a center bolster yieldingly supported upon the parts of the truck frame.

4. In a car truck, a series of wheel carrying axles, a truck frame composed of two separately formed and independently movable parts, each part comprising a transom and a pair of wheel pieces rigidly fixed thereto, each part having four points of support upon the axles, and a center bolster yieldingly supported at four points on the parts of the truck frame.

5. In a car truck, a series of wheel carrying axles, a truck frame composed of two separately formed and independently movable parts, each part comprising a transom and a pair of wheel pieces rigidly fixed thereto, each part having four points of support upon the axles, a center bolster supported by the truck frame, the points of support for said center bolster being located so that the supported load is transmitted to and divided equally between the axles, and a center bearing on said center bolster.

6. In a car truck, a series of wheel carrying axles, a truck frame composed of two separately formed and independently movable parts, each part comprising a transom and a pair of wheel pieces rigidly fixed thereto, each part having four points of support upon the axles, a center bolster supported by the truck frame, the points of support for said center bolster being located so that the supported load is transmitted to and divided equally between the axles, and side bearings on said center bolster.

7. In a car truck, a series of wheel carrying axles, an articulated truck frame supported by said axles, the parts of which truck frame are provided with transoms which occupy positions midway between the wheels of the truck, and a center bolster supported by said truck frame, the points of support for said center bolster being located to the outer sides of the transoms so that loads impressed on said bolster are transmitted to and equally divided between the axles of the truck.

8. In a car truck, a series of wheel carrying axles, an articulated truck frame supported by said axles, the parts of which truck frame are provided with transoms which occupy positions midway between the wheels of the truck, and a center bolster yieldingly supported on the truck frame, the points of support for said center bolster being located to the outer sides of the transoms so that loads impressed on said bolster are transmitted to and divided equally between the axles.

9. In a car truck, a truck frame formed in two independently movable parts, each comprising a transom, and a pair of wheel pieces rigidly fixed thereto, the ends of which wheel pieces are supported by the axles, and a center bolster supported by the transoms of the parts of the truck frame.

10. In a car truck, a truck frame formed in two independently movable parts, each comprising a transom and a pair of wheel pieces rigidly fixed thereto, the ends of which wheel pieces are supported by the axles, and a center bolster yieldingly supported upon the transoms of the truck frame.

11. In a car truck, a truck frame formed in two parts, each comprising a transom and a pair of wheel pieces, journal box engaging elements on the end portions of the wheel pieces, and spring supports on the transoms.

12. In a car truck, a truck frame comprising a pair of substantially H-shaped members, a substantially H-shaped center bolster supported by the H-shaped members of the truck frame, and side bearings on said center bolster.

13. In a car truck, the combination with a two-part truck frame, each part having a transom, of a substantially H-shaped center bolster, the ends of the side members of which overlie the transoms and are yieldingly supported by said transoms at points outside the body portions thereof.

14. In a car truck, a truck frame formed in two parts, each comprising a transom, and a pair of wheel pieces, a center bolster, parts of which overlie and extend beyond the transoms of the truck frame, spring supports projecting outwardly from the transoms and springs interposed between the spring supports and the overlying parts of the center bolster.

15. In a car truck, a truck frame formed in two parts, each comprising a transom and a pair of wheel pieces, a center bolster, parts of which overlie the transoms of the truck frame, springs interposed between the transoms and the overlying parts of the center bolster, and means for guiding the vertical movement of the center bolster with respect to the truck frame.

16. In a car truck, a truck frame formed in two parts each comprising a transom and a pair of wheel pieces, a center bolster, parts of which overlie and extend beyond the transoms of the parts of the truck frame, and spring carrying members projecting outwardly from ( transoms of the truck frame, which spring carrying members constitute supports for the overlying portions of the center bolster, and being located so that loads impressed on the center bolster are transmitted to and equally divided between the axles associated with said truck frame.

17. In a car truck, a truck frame formed in two parts, each comprising a transom and a pair of wheel pieces formed integral therewith, spring seats on the transoms, a center bolster having parts overlying the transoms and the spring seats thereon, and springs positioned on said spring seats and engaging the overlying portions of the center bolster.

18. In a car truck, a truck frame formed in two parts each comprising a transom and a pair of wheel pieces formed integral therewith, the end portions of said wheel pieces being adapted to engage journal boxes, and each part being independently movable with respect to the other.

19. In a car truck, a truck frame formed in two parts each comprising a transom and a pair of wheel pieces formed integral therewith, the end portions of said wheel pieces being adapted to engage journal boxes, each part being independently movable with respect to the other, and a center bolster supported by said frame members.

20. In a car truck, a truck frame formed in two parts each comprising an integrally formed transom and a pair of wheel pieces, each part being independently movable with respect to the other, a center bolster supported by said frame members, and side bearings on said center bolster.

21. In a car truck, a truck frame formed in two parts each comprising an integrally formed transom and a pair of wheel pieces, each part being independently movable with respect to the other, a center bolster, and supports on the transoms of the frame members for said center bolster, which supports are located so that loads impressed on said bolster are transmitted to and divided equally between the axles associated with the truck frame.

22. In a car truck, a series of wheel carrying axles, a truck frame formed in two parts each comprising an integrally formed transom and a pair of wheel pieces, each part being independently movable with respect to the other, a center bolster, and supports on the transoms of the parts of the truck frame, which supports are located so that loads impressed on said bolster are transmitted to and divided equally between the axles.

23. In a car truck, a series of wheel carrying axles, a truck frame formed in two parts each comprising an integrally formed transom and a pair of wheel pieces, each part being independently movable with respect to the other, a center bolster, supports on the transoms of the parts of the truck frame, which supports are located so that loads impressed on said bolster are transmitted to and divided equally between the axles, and side bearings on said center bolster.

In testimony whereof we hereunto affix our signatures in the presence of two witnesses, this 18th day of July, 1914.

CLARENCE H. HOWARD.
    HARRY M. PFLAGER.

Witnesses:
    HAL C. BELLVILLE,
    OTTO V. MYERS.